(12) United States Patent
Lesueur et al.

(10) Patent No.: US 6,343,879 B1
(45) Date of Patent: Feb. 5, 2002

(54) MECHANICAL SPLICE FOR CRIMPING OPTICAL FIBRE

(75) Inventors: Philippe Lesueur, Tregastel; Christian Liegeois, Soisy sur Seine; Philippe Egon, Pleumeur Bodou, all of (FR)

(73) Assignee: Cables Pirelli, Saint Maurice (FR)

( * ) Notice: Subject to any disclaimer, the term of this patent is extended or adjusted under 35 U.S.C. 154(b) by 0 days.

(21) Appl. No.: 09/355,523

(22) PCT Filed: Jan. 29, 1998

(86) PCT No.: PCT/FR98/00164

§ 371 Date: Oct. 4, 1999

§ 102(e) Date: Oct. 4, 1999

(87) PCT Pub. No.: WO98/34137

PCT Pub. Date: Aug. 6, 1998

(30) Foreign Application Priority Data

Jan. 30, 1997 (FR) .............................................. 97 01003

(51) Int. Cl.$^7$ .............................................. G02B 6/255
(52) U.S. Cl. .............................. 385/99; 385/45; 385/97; 385/98
(58) Field of Search .............................. 385/95, 96, 97, 385/98, 99, 70

(56) References Cited

U.S. PATENT DOCUMENTS

| 4,946,249 A | * | 8/1990 | Barlow et al. ................ 385/97 |
| 5,015,062 A | | 5/1991 | Finzel |
| 5,394,496 A | * | 2/1995 | Caldwell et al. .............. 385/70 |

FOREIGN PATENT DOCUMENTS

| EP | 0 026 553 | 4/1981 |
| EP | 0 421 071 | 4/1991 |
| EP | 0 674 198 | 9/1995 |
| WO | WO 94/04954 | 3/1994 |

\* cited by examiner

*Primary Examiner*—Hemang Sanghavi
*Assistant Examiner*—Scott A Knauss
(74) *Attorney, Agent, or Firm*—Finnegan, Henderson, Farabow, Garrett & Dunner, L.L.P.

(57) ABSTRACT

A splice for crimping optical fibers includes two half-cylinders, a support block and a pressing block, which are mutually pressed by a crimping cylinder. The support block is provided with a longitudinal groove for receiving the stripped fiber and bears capped edges. The capped edges and stops are symmetrically mounted on either side of the longitudinal axis of the half-cylinders and are designed for maintaining axis of the half-cylinders and are designed for maintaining a small space between the two half-cylinders in the zone where they are located.

6 Claims, 4 Drawing Sheets

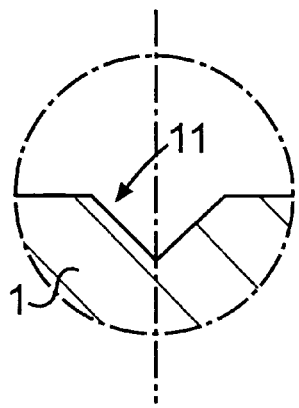
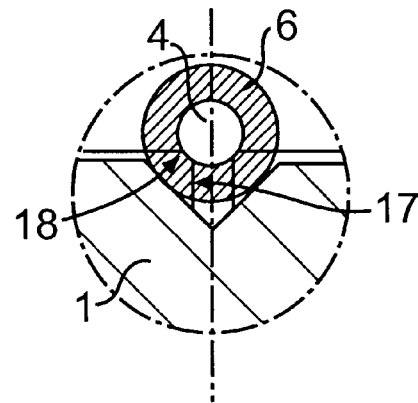
FIG. 5  FIG. 6
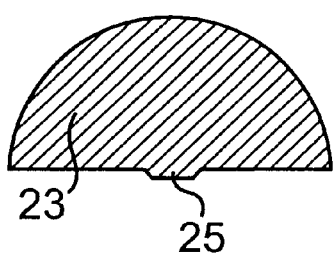
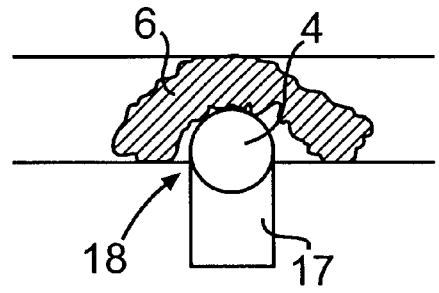
FIG. 9  FIG. 10

MECHANICAL SPLICE FOR CRIMPING OPTICAL FIBRE

BACKGROUND OF THE INVENTION

The invention relates to a mechanical splice for the self-stripping crimping of two covered optical fibers.

Systems exist for mechanically crimping single fibers or several fibers originating from cables or tapes which are to be joined. These systems consist of immobilizing the stripped ends of the optical fiber or optics in an assembly body, the clamping of which will hold the ends to each other. DE 39 25 826 describes a mechanical splice composed of two semicylinders constructed in symmetrical manner relative to their median transverse plane and clamped against each other by a crimping cylinder.

The invention proposes a simple and low-cost mechanical crimper, suited to the self-stripping crimping of optical fibers.

SUMMARY OF THE INVENTION

A principal subject of the present invention thus relates to a mechanical crimper intended for the self-stripping crimping of two covered optical fibers placed end to end, composed of two semicylindrical blocks constructed symmetrically relative to their median transverse plane and each having a flat longitudinal diametral face as well a deformable cylindrical crimping tube which clamps the semicylindrical blocks against each another, diametral face against diametral face, one of the semicylindrical blocks being provided on at least one part of the length of its flat diametral face, with a longitudinal V-shaped groove intended to receive the two covered fibers to be crimped, and the semicylindrical blocks carrying raised or recessed elements placed symmetrically on both sides of their longitudinal axis, elements which are intended to maintain a small gap between the semicylindrical blocks relative to each other, in the zones where these elements are located. According to the invention, one of the semicylindrical blocks has on each side of the median plane an end zone for the introduction of the covered fiber having an opening which widens to the outside which extends into the intermediate zone provided with said V-shaped groove for receiving the covered fiber, and a central zone bearing a U-shaped groove which extends the V-shaped groove, said U-shaped groove having edges separated one from the other by a distance less than the external diameter of the covered fibers, to allow the splitting of the covering at the end of the fibers.

According to another characteristic, the other semicylindrical block forming a clamping and splitting cover has an inclined face in the same end zone, a V-shaped groove in the same intermediate zone and a raised element forming a longitudinal thicker section in the same central zone.

BRIEF DESCRIPTION OF THE DRAWINGS

Other particular characteristics and advantages of the invention will become apparent from the following description of an embodiment in which reference will be made to the attached drawings which represent:

FIGS. 5 and 6, enlarged cross-sectional views along V—V and VI—VI of FIG. 3 respectively.

FIG. 9, an enlarged cross-sectional view along IX—IX of FIG. 8.

FIG. 10, a schematic cross-sectional view of a optical fiber in the self-stripping crimping phase.

DETAILED DESCRIPTION OF THE PREFERRED EMBODIMENTS

Figure 1:
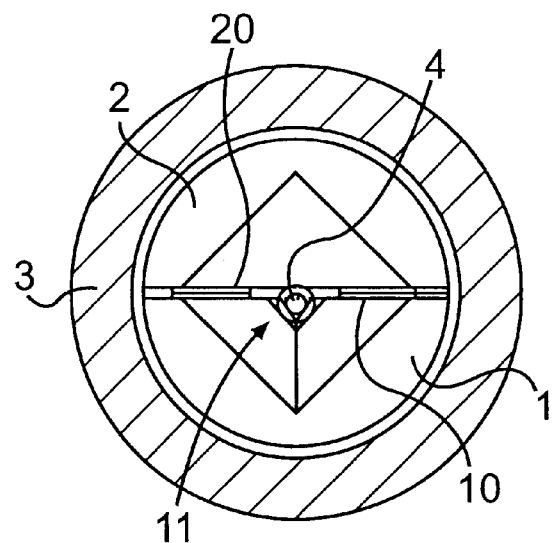
FIGS. 1 and 2, cross-sectional views of a mechanical splice according to the prior art, before and after crimping respectively.

FIG. 1 shows schematically a mechanical crimper known according to the prior art for a standard single fiber 4. This crimper is essentially composed of a support block of semicylindrical numbered 1 as a whole, a pressure block also of semicylindrical section numbered 2 as a whole and a crimping cylinder 3. The stripped fiber 4 is placed in a V-shaped groove 11 provided in the center of the diametral face of the support block 1. On both sides of this groove, i.e. on both sides of the longitudinal axis of the semicylinder, the support block is equipped with heels 10 forming a thicker section above this upper face. The pressure block 2 is placed above the support block 1, its lower face 21 being opposite the upper face 14 of the support block. The pressure block also has shoulders 20 forming a thicker section, which are opposite the heels 10. The lower face of the pressure block is flat. It should be noted that the two blocks are wholly accommodated inside the crimping cylinder 3.

Figure 2:
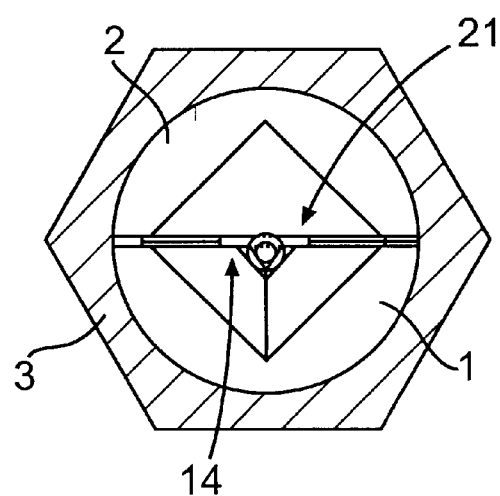

When the two ends of the two optical fibers to be joined have been positioned end to end in groove 11, crimping is carried out by deforming the crimping cylinder 3 into a hexagonal matrix. It can be seen in FIG. 2 that the two semicylinders 1 and 2 are clamped against each other and in the central zone where the two fibers are in contact, the deformation of the support block and pressure block will cause the clamping of the optical fiber between the flat part of the pressure block and the V-shaped groove of the support block.

Figure 3:
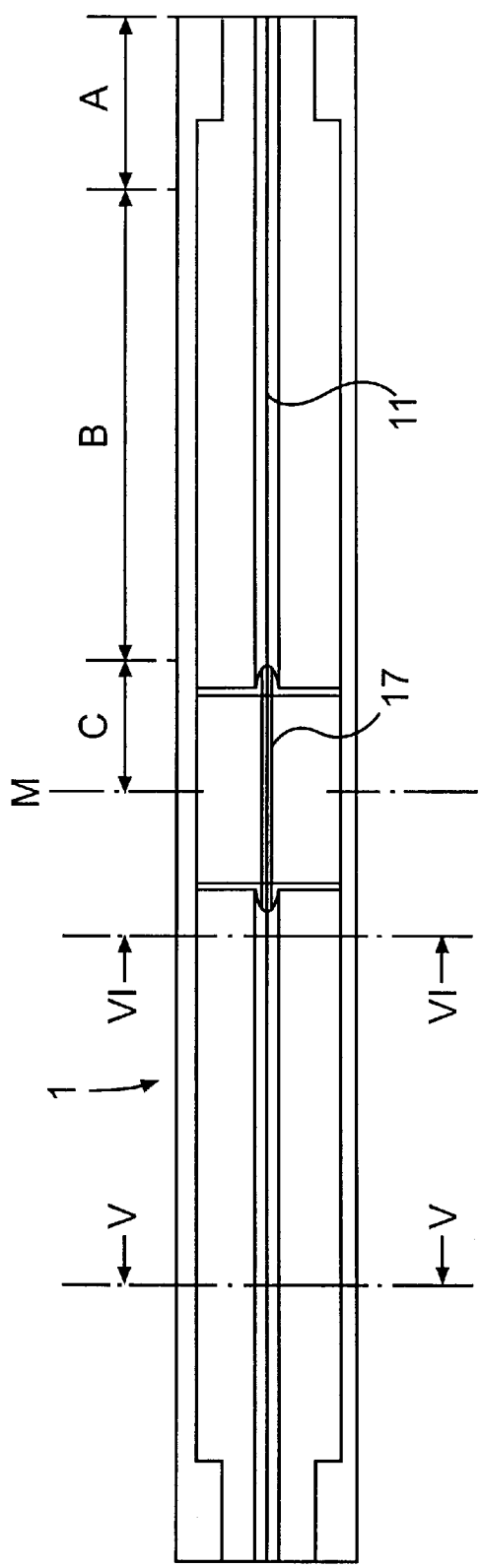
FIGS. 3 and 4, plane and elevation views respectively of a semicylindrical block forming the support for the fibers.
Figure 4:
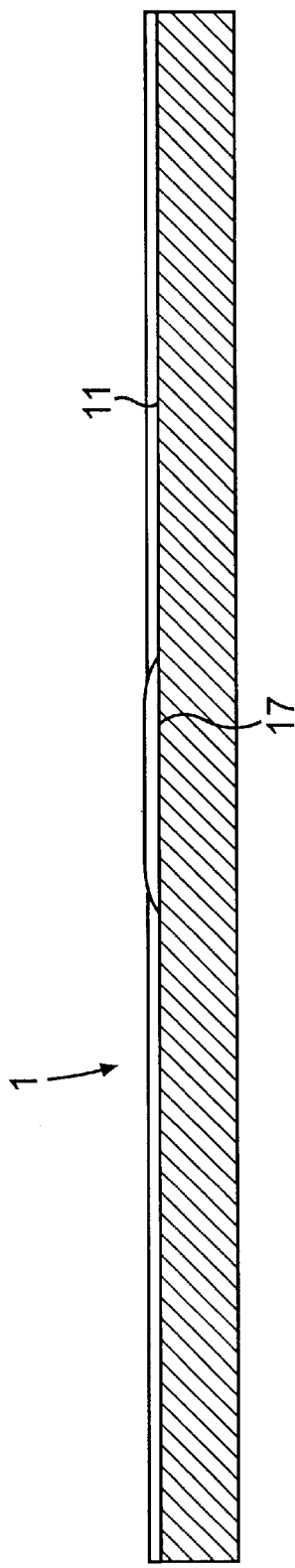
Figure 7:
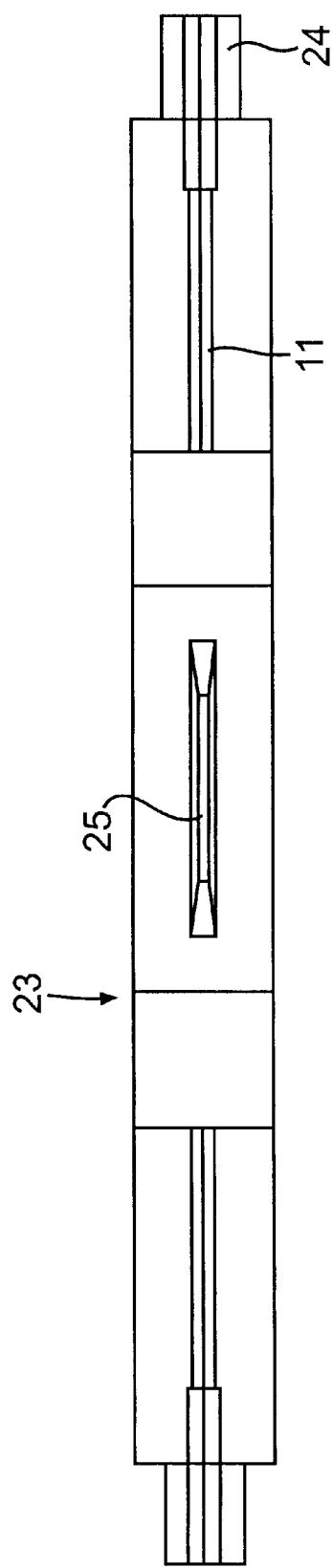
FIGS. 7 and 8, plan and elevation views respectively of a semicylinder forming the clamping and splitting cover for the self-stripping of the fiber.
Figure 8:
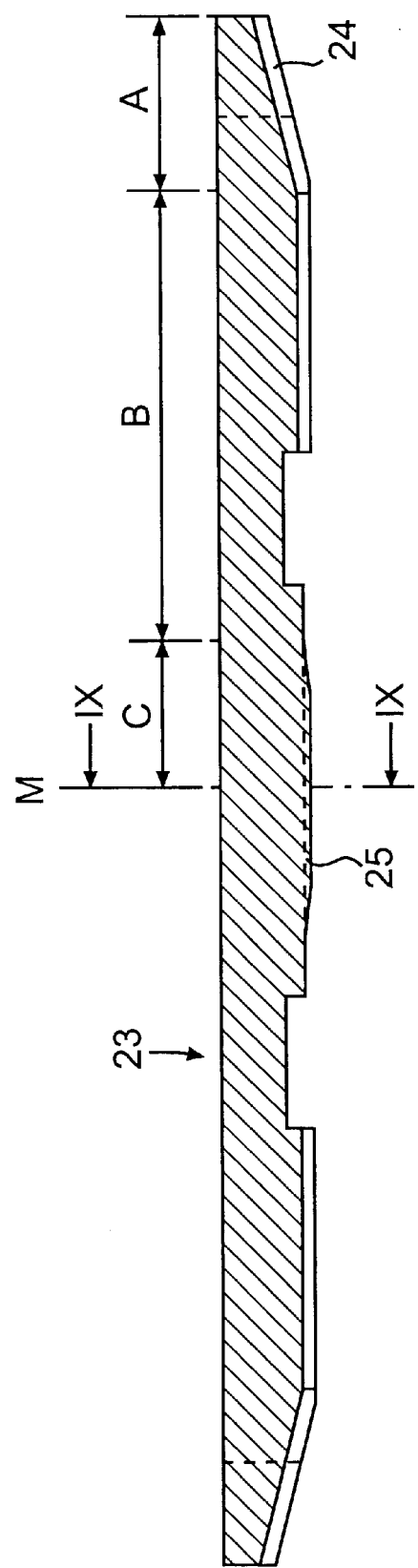

FIGS. 3 and 4 show schematically a support block of semicylindrical section according to the invention numbered 1 as a whole. FIGS. 7 and 8 show a pressure block also of semicylindrical section numbered 23 as a whole.

These blocks bear raised or recessed elements placed symmetrically on both sides of their longitudinal axis, elements which are intended to maintain a small gap between the semicylindrical blocks relative to each other in the zones where these elements are located.

The support and pressure block assembly is covered by a crimping cylinder not shown.

The support block 1 illustrated in FIGS. 3 and 4 shows a particular embodiment of one of the semicylindrical blocks in the case of a splice intended for the self-stripping crimping of two optical fibers. It is constructed symmetrically relative to its median transverse plane M. A first zone A for introducing the fiber is found on each side. This opening connects to a V-shaped groove 11 which extends over a length B, the groove being centered on the axis of the semicylindrical block.

In the central zone C, the V-shaped groove is extended by a U-shaped groove 17, the edges 18 of which receive a fiber 4 with its covering 6, as is seen more clearly in FIGS. 5 and 6. In FIGS. 7 and 8, a clamping and splitting cover 23 is represented with its zones A, B and C corresponding to those of the support block. In zone A, an inclined face 24 encourages the introduction of the covered fiber. Zone B has a V-shaped groove 11, but the central zone of the cover (zone C) is provided with a longitudinal thicker section 25. The particular shape of this thicker section 25 is seen more clearly in FIG. 9. When the splice is assembled, the inclined face 24 of zone A together with the support block 1 forms an entrance for the introduction of the optical fiber.

The corresponding parts of zone B, when they are assembled, form the part in which the covering of the optical fiber rests.

When the non-stripped fibers are introduced into the splice, they come to rest in zone C between the U-shaped groove 17 of the support block 1 and the thicker section 25.

After crimping, the covering of the fiber is "split" by the edges 18 of the groove 17 as illustrated in FIG. 10. The stripped part of the fiber is then positioned between these two edges whilst the split covering 6 is pushed away to the sides. The stripped fiber is then held in position by the thicker section 25.

What is claimed is:

1. An apparatus for splicing and stripping covered optical fibers placed end to end, comprising:

a support block having a flat diametral longitudinal face comprising:

a V-shaped longitudinal groove provided on at least an intermediate zone of the flat diametral longitudinal face and configured to receive the covered optical fibers, and a U-shaped longitudinal groove located in a central zone of the flat diametral longitudinal face, the U-shaped longitudinal groove extending the V-shaped longitudinal groove of the intermediate zone and having edges separated by a distance less than the external diameter of the covered optical fibers to allow splitting of a covering at the ends of the covered optical fibers;

a clamping and splitting cover having a flat diametral longitudinal face; and a deformable cylindrical crimping tube configured to engage the flat diametral longitudinal face of the support block with the flat diametral longitudinal face of the clamping and splitting cover.

2. The apparatus of claim 1, wherein the flat diametral longitudinal face of the support block and the flat diametral longitudinal face of the clamping and splitting cover include recesses positioned symmetrical to each other to maintain a small gap between the support block and the clamping and splitting cover relative to each other.

3. The apparatus of claim 1, wherein the flat diametral longitudinal face of the clamping and splitting cover includes a V-shaped longitudinal groove in an area corresponding to the intermediate zone of the flat diametral face of the support block.

4. The apparatus of claim 1, wherein the clamping and splitting cover further comprises a raised section in an area corresponding to the central zone of the flat diametral longitudinal face of the support block.

5. The apparatus of claim 1, wherein the support block further comprises inclined surfaces at the ends of the support block configured to facilitate the introduction of the covered optical fibers.

6. The apparatus of claim 1, wherein the clamping and splitting cover further comprises inclined surfaces at the ends of the clamping and splitting cover configured to facilitate the introduction of the covered optical fibers.

* * * * *